Oct. 3, 1944.   G. WALTHER ET AL   2,359,498
TRACTOR-TRAILER COUPLING MEANS
Filed Aug. 5, 1940   3 Sheets-Sheet 1

INVENTORS
GEORGE WALTHER
ELMER L MILLER
BY Robb & Robb
ATTORNEYS

Oct. 3, 1944.   G. WALTHER ET AL   2,359,498
TRACTOR-TRAILER COUPLING MEANS
Filed Aug. 5, 1940   3 Sheets-Sheet 3

INVENTORS
GEORGE WALTHER
ELMER L. MILLER
BY
Robb & Robb
ATTORNEYS

Patented Oct. 3, 1944

2,359,498

UNITED STATES PATENT OFFICE 2,359,498

TRACTOR-TRAILER COUPLING MEANS

George Walther and Elmer L. Miller, Dayton, Ohio, assignors to The Dayton Steel Foundry Company, Dayton, Ohio, a corporation of Ohio Application August 5, 1940, Serial No. 351,540

5 Claims. (Cl. 280—33.1)

This invention relates to the art of tractor and semi-trailer combination vehicles, wherein the same are connected through articulated means such as the commonly employed fifth wheel structure. This fifth wheel structure usually includes a lower fifth wheel member on the tractor and an upper fifth wheel member on the forward end of the trailer, which rests upon the lower fifth wheel on the tractor, the vehicles, when in coupled relation for road travel, being connected through a swivel connection provided by a king pin carried by one of the fifth wheel members and locked to the other by means of suitable locking means carried by the latter.

One of the fifth wheel members is preferably mounted to rock about a horizontal axis disposed transversely of the vehicle upon which it is mounted. It is usual today to provide the lower fifth wheel with such rocking mounting and the mounting of the lower fifth wheel is such that when the vehicles are disconnected, the lower fifth wheel normally inclines rearwardly to provide an inclined plane for elevating the forward end of the trailer when the tractor backs into it in coupling.

In the coupling of tractor and semi-trailers provided with the fifth wheel coupling means herein referred to, the same are subject to considerable shock incident to the contact of the fifth wheel plates and the contact of the king pin with the locking jaws when the tractor backs into the trailer for coupling. Likewise, during travel, the coupled relation of the fifth wheels is productive of considerable noise and clatter, as well as wear of certain parts, notably the inter-engaging portions of the king pin and locking jaws.

The king pin, which is usually mounted on the upper trailer fifth wheel, is provided with a circumferential groove near its lower end with which a part of the fifth wheel locking mechanism is adapted to engage to prevent vertical displacement of the king pin from locking engagement with the lower fifth wheel when the vehicles are in coupled relation, and this king pin constitutes the swivel connection between the vehicle fifth wheels enabling the tractor fifth wheel to turn about a vertical axis relative to the trailer fifth wheel. The king pin, being rigidly secured to the upper or trailer fifth wheel and somewhat loosely engaged by the locking means on the lower tractor fifth wheel to permit of relative turning of the fifth wheels, is subjected to a considerable amount of wear and strain which in many cases eventually causes breakage of the king pin particularly at the point of reduced diameter thereof engaged by the locking jaws.

It is a principal object of the present invention to eliminate the aforementioned shock and noise as much as possible by providing a resilient or cushioned mounting for one or both of said fifth wheels respecting the vehicle to which it is attached and by providing resilient mountings of the king pin and locking jaw parts relative to their respective fifth wheels. Preferably, the resilient mounting of either of the fifth wheels relative to its vehicle should provide not only for cushioning of the shock incident to the coupling contact of the fifth wheels, but should provide for the cushioning of vertical and longitudinal thrust action of the vehicles relative to one another during travel in coupled relation.

Another principal object of the present invention is to minimize wear at the inter-engaging portions of the king pin and locking jaws, having in view primarily the elimination of the aforementioned difficulty with regard to king pin breakage.

With the foregoing ends in view, the present invention makes novel provision for the resilient mounting of the rockable fifth wheel relative to its vehicle, such that the same is cushioned in respect to permissive longitudinal and vertical movement of said fifth wheel relative to its vehicle. This novel mounting avails of helical spring means cushioning the transverse rockable axis of the fifth wheel respecting the vehicle to which it is connected.

The invention discloses alternative modes of cushioning the lock jaws or parts thereof relative to the fifth wheel.

A novel mounting of the king pin is provided such that the same is resiliently cushioned relative to its fifth wheel, as well as swively mounted thereto, in one embodiment of the invention, for the purpose of eliminating the wear thereon to which such king pins are commonly subjected, as above mentioned.

As an alternative to swivel mounting of the king pin for minimizing wear thereon, the invention discloses a ball bearing connection between the king pin and the locking jaws.

Other objects and advantages and features of novelty will appear more fully as the description of this invention progresses, in conjunction with the accompanying drawings, in which—

Figure 1:
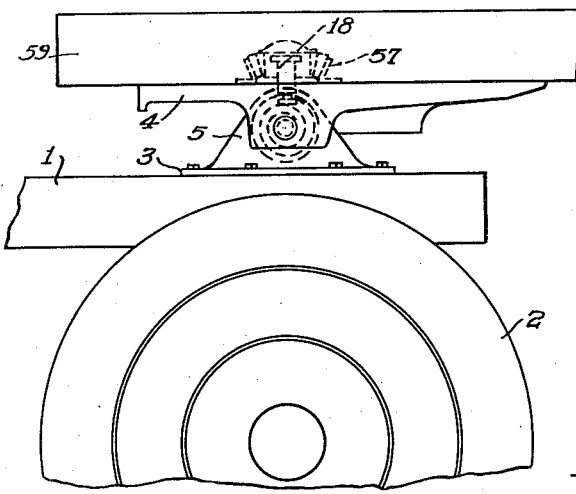
Figure 1 is a side elevational view showing the rear end of a tractor and the forward end of a trailer in coupled relation and embodying the invention.

The numeral 1 designates the frame of a tractor vehicle, and 2 the rear driving wheels thereof. Mounted upon the frame 1' of the tractor are brackets 3 for supporting the lower fifth wheel 4 upon the tractor. The brackets 3 comprise a housing 5 of circular shape having a closed outer side 6, and open at its inner side, as indicated at 7, for the reception of a helical spring 8.

The fifth wheel 4 is provided with depending ears 10 and 11, having suitable apertures therein, adapted for the receipt of journal bolts 9 for journaling the fifth wheel 4 rockably relative to the brackets 3. The sides 6 of the housings 5 are provided with apertures 12 of somewhat greater diameter than the journal bolts 9, to permit a certain amount of relative movement of the fifth wheel relative to the brackets 3 when the journal bolts 9 are assembled, as shown in Figures 3 to 5, passing through the respective apertures in the ears 10 and 11, and the aperture 12 in said housing, and with the springs 8 mounted in said housings surrounding said journal bolts.

The journal bolts 9 are provided with heads 9a which may engage one side of the ear 11 and nuts 9b which may be threaded on said bolts for engagement with the ear 10 when the fifth wheel is assembled on the brackets 3 as just described.

Figure 2:
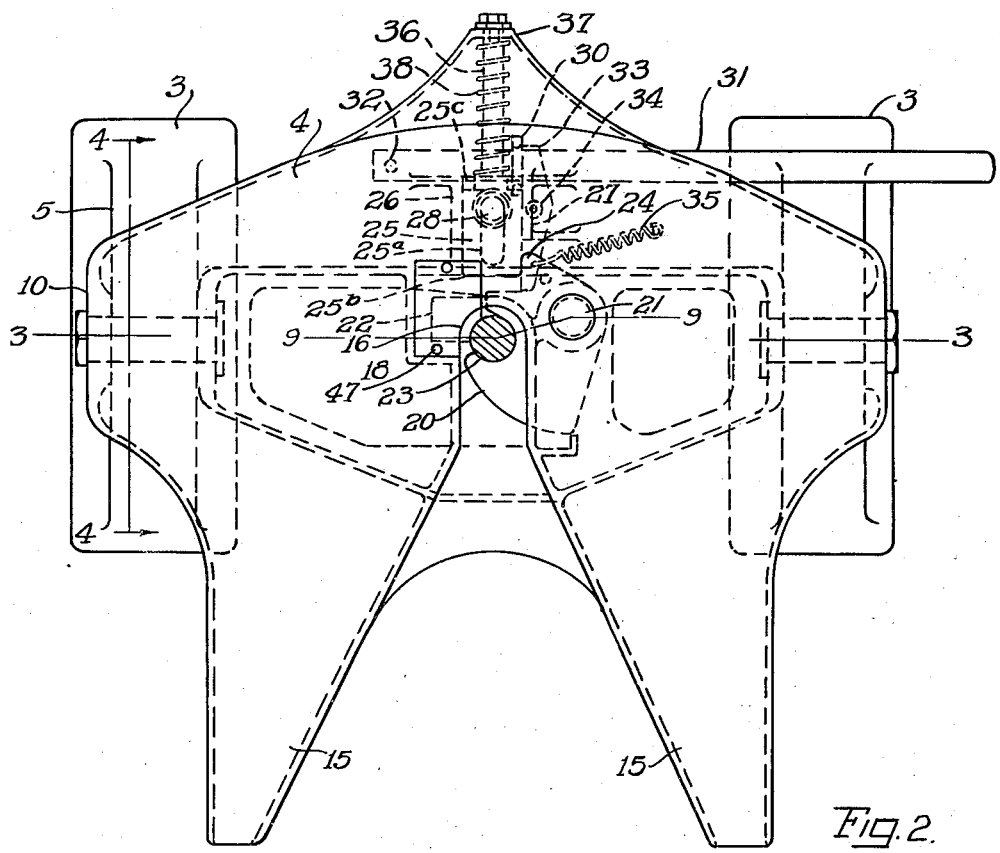
Figure 2 is a top plan view of the lower fifth wheel embodying certain features of the invention.
Figure 3:
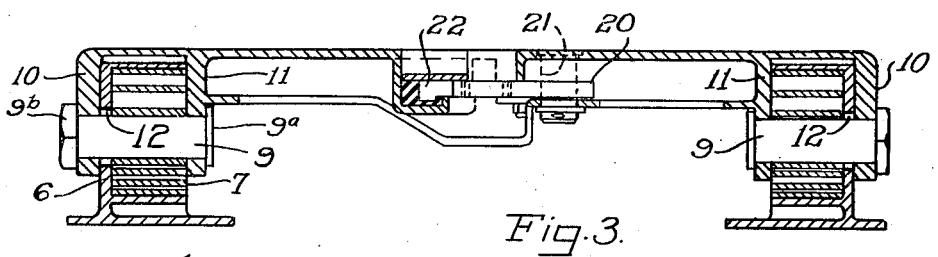
Figure 3 is a transverse, vertical sectional view of the said fifth wheel, taken on the line 3—3 of Figure 2.
Figure 4:
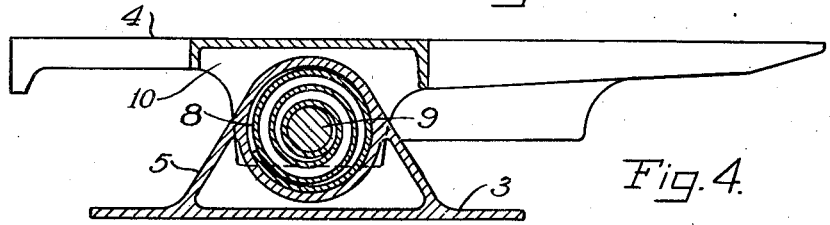
Figure 4 is a longitudinal, vertical sectional view taken on the line 4—4 of Figure 2.

When the lower fifth wheel 4 is assembled for rocking movement relative to the brackets 3, as shown in Figures 2 to 4, the weight of the fifth wheel is directly supported through the journal pins 9 by the helical springs 8 resting in the housings 5 so that the fifth wheel is cushioned relative to the supporting brackets 3 for floating movement thereon, the extent of which is limited by the difference in the diameters of the journal pins 9 and the apertures 12 in the housings 5 through which said journal pins pass.

Figure 5:
Figure 5 is a view of the lower fifth wheel mounting bracket similar to that shown in Figure 4, but availing of a modified resilient connection of the lower fifth wheel thereto.

If desired, the cushioning effect of the mounting by means of helical springs alone, as best shown in Figure 4, may be supplemented by the employment of resilient material, such as rubber, indicated at 13 in Figure 5, as being wound between and about the coils of the helical springs 8.

The rubber or other resilient material 13 may be secured to the springs 8 in any suitable manner such as by vulcanization or riveting of the rubber to the springs. Or, it may be advisable to grease the helical spring and to dampen the noise of the spring action by means of an oil-treated anti-squeak fabric or leather strip wound between the coils of the spring. The subject matter of Figures 3, 4, and 5 is claimed in our co-pending divisional application Serial No. 387,766, filed April 9, 1941, for Tractor-trailer coupling means.

Figure 9:
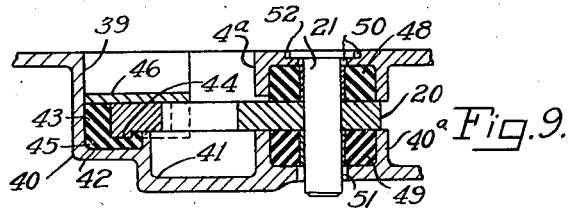
Figure 9 is a partial vertical section taken on the line 9—9 of Figure 2.
Figure 10:
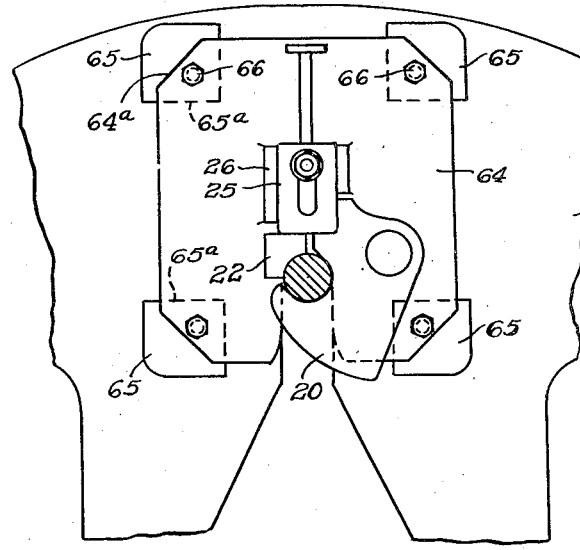
Figure 10 is a top plan view of a portion of a fifth wheel member embodying a modification of the invention.

The subject matter of Figures 9 and 10 is claimed in our co-pending divisional application Serial No. 547,538, filed August 1, 1944, for Fifth wheel coupling means.

The lower fifth wheel 4 is provided with rearwardly extending wings 15, which define a V-shaped slot leading into a socket 16, at the inner end of the slot which is toward the center of the fifth wheel.

During coupling of the tractor and trailer, the upper fifth wheel king pin 18 is received within the confines of the V-shaped slot provided by the wings 15, when the lower fifth wheel is raised to horizontal position by engagement of the upper fifth wheel bolster plate 19, therewith, as the tractor backs into the trailer and the king pin 18 ultimately comes to seat in the socket 16, and is locked therein by suitable locking means.

This locking means may comprise a hook or jaw member 20 pivoted to the fifth wheel 4, as at 21. The socket 16 is provided with an abutment 22 having an arcuately curved portion which together with the arcuately curved socket portion 23 of the jaw 20 closely engages the king pin when the parts are in the position shown in Figure 2 to maintain the king pin locked in the fifth wheel socket, by means such as now to be described.

The jaw 20 is normally maintained in the position shown in Figure 2 by the engagement of an abutment 24 on the jaw member with a plunger 25 mounted for sliding movement between opposing bosses 26 and 27 and secured to the fifth wheel by means of a bolt 28 extending through an elongated slot 25a in said plunger. The plunger is provided with a recessed extension 30 engaging with a lever 31 pivoted to the fifth wheel as at 32. An arm 33, centrally pivoted, as at 34, to the fifth wheel engages one side of the plunger 25, and one end of said arm 33 is tensioned by a spring 35. The plunger 25 is provided with a rod extension 36 extending through an aperture in the vertical web 37 at the forward end of the fifth wheel 4. Surrounding this rod extension 36 is a coil spring 38, one end of which bears against the forward end 25c of the plunger 25, and the other end of which bears against the other web 37.

When the vehicles are to be uncoupled to release the king pin 18 from locked engagement with the jaw 20, indicated by Figure 2, the lever 31 is actuated to move the plunger 25 forwardly of the fifth wheel against the compression of the spring 38 until the plunger is free of the arm 33, whereupon the latter is moved about its pivot by the spring 35 to a position in which it engages behind the rear end 25b of the plunger 25, to maintain the latter free of the abutment 24 of the jaw 20 enabling the jaw to turn freely about its pivot 21 so as to release the king pin 18 from the position indicated by Figure 2 and permit the tractor to move away from the trailer.

Resilient mountings are provided for the locking jaw 20 and the abutment 22 to cushion the same relative to the fifth wheel 4 and thus minimize shock incident to engagement of the king pin with such parts during coupling of the tractor and trailer vehicles, as well as during travel of said vehicles in coupled relation. Figures 2 and 9 will now be referred to.

The fifth wheel 4 is provided with a recess 39 formed by a web 40 having a pocket 41 therein for accommodating the king pin 18 when the same is received in locked position at the inner end of the socket 16. Formed in this recessed portion 39 also is a pocket 42 for the accommodation of a body of resilient material 43, such as rubber or the like, which in turn is formed with a pocket 44 therein which is adapted to receive the depending portion 45 formed at two sides 16a and 16b of the plate forming the abutment member 16, so that this abutment plate is resiliently cushioned respecting the fifth wheel 4.

A cover plate 46 secured to the web 40 by means of suitable bolts 47 serves to maintain the rubber body 43 and the abutment plates 16 in proper position.

Formed on the under surface of the fifth wheel 4 and on the upper surface of the web 40 are hollow bosses 4a and 40a respectively for receiving bodies of resilient material 48 and 49, such as rubber or the like. Centrally of said bosses, there are provided in the main portion of the fifth wheel bolster plate and in the web 40 apertures 50 and 51 respectively for receiving the stud bolt 21 upon which the locking jaw 20 is mounted. The apertures 50 and 51 are of slightly larger diameter than the stud bolt 21 and a corresponding amount of clearance is provided at 52a for the head of said bolt to permit a certain amount of movement of the bolt 21 and its associated locking jaw 20 relative to the fifth wheel, which movement is cushioned by the rubber bodies 48 and 49.

Figure 6:
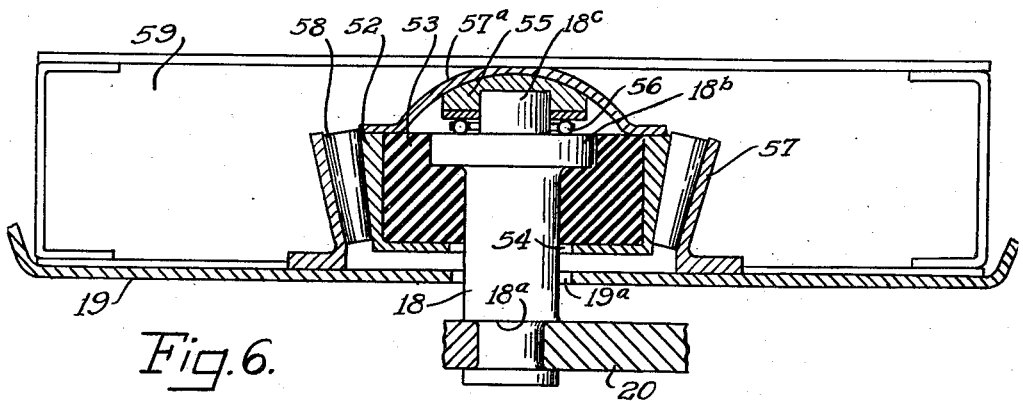
Figure 6 is a side elevation portion of the trailer frame showing the novel mounting of the kin pin according to the invention thereon, parts of said view being in section.

In reference to cushioning of certain of the contacting parts of the coupling members, the upper fifth wheel king pin is preferably mounted in a body of resilient material for cushioning the same relative to the vehicle to which it is attached. Reference is now made particularly to Figures 1 and 6.

The king pin 18 is provided at its lower end with a circumferential groove 18a and the locking jaw 20 is of such thickness as to enable the socket portion 23 thereof to engage in said groove, when the parts are in the position indicated by Figure 2, in such a manner as to prevent vertical displacement of the upper fifth wheel relative to the lower fifth wheel.

The constructions of fifth wheel coupling means heretofore employed have contemplated the use of a king pin which is fixed to its fifth wheel so as not to be rotatable relative thereto. In such constructions, therefore, the locking jaws of the fifth wheel on the other vehicle must loosely engage the king pin so as to permit turning movement of the vehicle to which the king pin is attached relative to the coupling member of the other vehicle, which includes the locking means cooperating with said king pin. Under such conditions, when the locking jaw, such as 20, is loosely engaged in a circumferential groove, such as 18a, of a king pin 18, turning movement of the locking jaw relative to the king pin causes wear of the parts and because of the reduced diameter of the king pin, necessitated by the provision of the groove, such wear in many instances eventually causes breakage of the king pin at such point of reduced diameter.

In order to eliminate this difficulty, the present invention contemplates mounting of the king pin 18 to rotate relatively to the upper fifth wheel bolster plate 19, and further contemplates that the king pin shall be tightly engaged by the arcuate socket portion 23 of the jaw 20, and by the corresponding portion of the abutment 22 so that the king pin cannot rotate relatively to the lower fifth wheel during relative turning movement of the tractor and trailer vehicles when the king pin is in the locked condition shown by Figure 2.

To carry into effect the objective of resiliently mounting the king pin relative to its vehicle, as well as to make provision for the rotatability of the king pin relative to its vehicle, a housing may be provided, as indicated at 52, seen best in Figure 6. A body of resilient material 53, such as rubber or the like, is positioned within the housing and is provided with a suitable recess for the reception of the collar portion 18b of the king pin 18, the shank portion of which extends through an aperture 54 provided in the bottom of the housing 52, and through a corresponding aperture 19a in the upper fifth wheel bolster plate 19. The upper end 18c of the king pin is journaled for rotation in a member 55 which has an arcuate surface corresponding to the curvature of the dome-shaped cover 57a secured to the flared boss 57.

Suitable vertical thrust bearings 56 are provided between, and engaging with, the lower surface of the member 55 and the upper surface of the collar portion 18b. The king pin unit, comprising the king pin 18, the housing 52, and the resilient body 53 is rotatable relative to the bolster plate 19 within the flared boss 57 secured to, or formed integral with, the bolster plate 19. For rotatability of the king pin unit respecting the flared boss 57, there are provided between the latter and the housing 52 suitable bearings, which may be tapered roller bearings 58, as seen best in Figure 6.

The king pin structure just described thus makes provision for the resilient mounting of the king pin such that the latter is cushioned in the resilient body 53 for pendulous movement in the housing 52 within the limits provided by engagement of the shank portion of the king pin with the walls of the apertures 54 and 19a, which apertures are of somewhat greater diameter than the shank portion of the king pin.

The upper fifth wheel bolster plate 19 is secured to the frame 59 of a trailer vehicle in any suitable manner.

Figure 7:
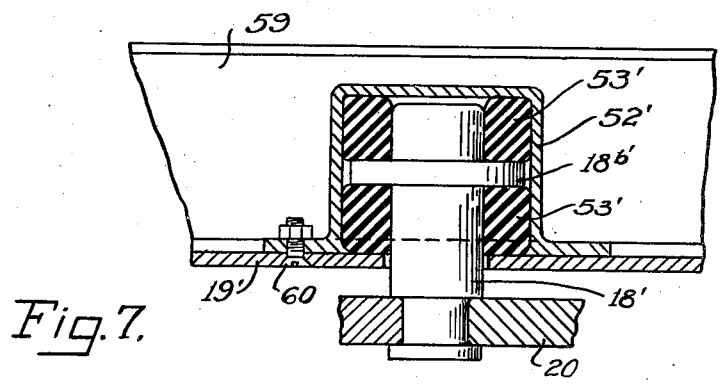
Figure 7 is a view similar to Figure 6 of a modification of the construction of Figure 6.

A modified form of resilient mounting of the king pin is shown in Figure 7, wherein the king pin, however, is not intended to rotate relatively to its fifth wheel bolster plate. In this construction a housing 52' is provided which is secured directly to the bolster plate 19' by means of suitable bolts 60. The shank of the king pin 18' is provided with an integral collar 18b', and bodies of rubber 53' are provided within the housing 52', above and below the collar portion 18b', and surrounding the shank portion of the king pin.

When the modified king pin mounting, just described, is employed, the socket portions of the jaw 20 and abutment 22 will be adapted to loosely engage the king pin when the same is locked to the lower fifth wheel to readily enable relative turning movement of the tractor and trailer vehicles during which the king pin will rotate relatively to the lower fifth wheel.

Figure 8:
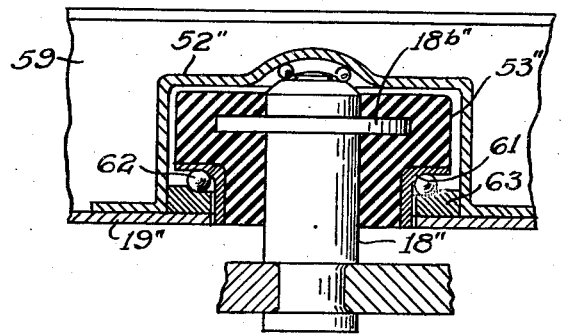
Figure 8 is a view similar to Figures 6 and 7 of another modification of this construction.

Another modified king pin construction is shown in Figure 8, wherein again the king pin is adapted for relative rotation respecting its upper fifth wheel bolster plate 19''. In this construction a housing 52'' is suitably secured directly to the upper fifth wheel bolster plate, and the king pin 18'' is provided with a collar portion 18b'', which is embedded in a resilient body 53'', provided with a cylindrical bearing portion 61 mounted for rotation relative to the bolster plate upon ball bearings 62, working in suitable races provided in the bearing members 61 and 63, the latter being tightly fitted in the housing 52''.

Since in this construction the king pin 18'' may rotate relatively to the fifth wheel upon which it is mounted, provision may be made for tightly engaging the locking means on the lower fifth wheel with the king pin when the same is in locked condition, so that under such condition the king pin will rotate relative to the upper fifth wheel, but will not rotate relatively to the lower fifth wheel during turning movement of the tractor and trailer vehicles when in coupled relation.

A modified form of resilient mounting for the locking jaw and abutment parts 20 and 22, respectively, is shown in Figure 10, wherein these parts are secured to a plate 64 which is resiliently mounted relative to the lower fifth wheel bolster plate 4' upon cushion pads 65 which may be of rubber or any other suitable resilient material. These pads 65 may be positioned as shown at the four corners of the plate 64 and may be formed with a part cut away and conforming to the configuration of the corners 64a of the plate 64 to provide inset shelf portions 65a upon which the corners 64a of the plate 64 may rest inset so that the upper surfaces of the pads 65 and the plate 64 will be flush. The plate 64 is secured to the fifth wheel by means of bolts 66 passing through the rubber pads into the fifth wheel body 4'. The cutting away of the pads 65, as before mentioned, provides a vertical shoulder thereon engaging the corners 64a of the plate 64 which aids in maintaining the plate 64 in proper position upon the pads 65.

Figure 12:
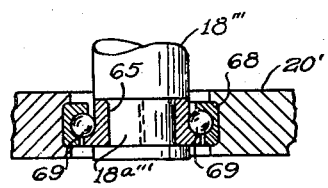
Figure 12 is a vertical sectional view of the same parts shown in Figure 11.
Figure 11:
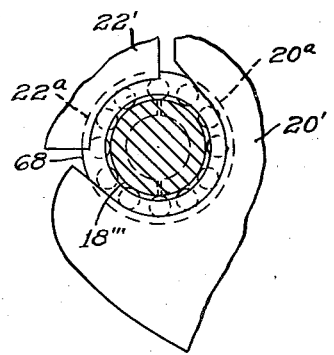
Figure 11 is a plan view of portions of a modified form of locking means.

A modification in reference to the king pin and locking jaw parts wherein the same have a roller bearing connection when the king pin is in locked position is shown in Figures 11 and 12. In the form there shown, the king pin 18''' is provided with a circumferential groove 18a''' in which is fitted the inner ball bearing race 67, which is a split race to enable its assembly in said groove. The outer race 68 is supported on the king pin 18''' by the ball bearings 69 operating between said races.

In practice the ball bearing means, just described, will be assembled on the king pin as follows: The outer race 68 and the cage containing the ball bearings 69 will first be slipped around the king pin and moved to a position above the groove 18a'''. Then the split race 67 will be assembled in the groove after which the ball bearings and the outer race can be moved downwardly to the position shown in Figure 12. The locking jaw 20' and the abutment plate 22' are respectively provided with annular grooves 20a and 22a for receiving the outer race 68 when the king pin 18''' is lockingly engaged thereby, for the prevention of vertical separation of the upper and lower fifth wheels when the tractor and trailer are in coupled relation.

When the construction just described is employed and the tractor and trailer are in coupled relation, relative turning movement of said vehicles about the connection provided by the king pin and locking jaws will enable rotation of the king pin relatively to the locking jaws while being maintained against vertical separation therefrom without the accustomed wear upon the king pin to which the king pin is subject in constructions heretofore known.

Having thus described our invention, what we claim as new and desire to secure by Letters Patent of the United States is:

1. Fifth wheel coupling means for tractor-trailer vehicles, comprising a fifth wheel, a king pin rotatively mounted upon the fifth wheel, a second fifth wheel adapted for face to face contact with the first fifth wheel when said fifth wheels are in coupling relation, king pin engaging means on the second fifth wheel comprising jaw means clampingly engageable automatically with the king pin upon coupling engagement so the latter will turn with the jaw means when one fifth wheel rotates relatively to the other, and a resilient body in which the king pin is mounted for absorbing shocks transmitted to the king pin in vehicle operation.

2. Fifth wheel coupling means for tractor-trailer vehicles comprising a fifth wheel, a king pin rotatively mounted upon the fifth wheel, anti-friction bearings supporting said king pin for rotation upon its fifth wheel, a second fifth wheel adapted for face to face contact with the first fifth wheel when said fifth wheels are in coupling relation, and coupling means on the second fifth wheel comprising jaws to impinge and clamp the king pin for connecting vehicle units carrying the fifth wheels and for causing the turning of the king pin with the jaws incident to the articulation of the vehicles by which the fifth wheels are carried.

3. Fifth wheel coupling means for tractor-trailer vehicles, comprising a fifth wheel, a king pin rotatively mounted upon the fifth wheel, a second fifth wheel adapted for face to face contact with the first fifth wheel when said fifth wheels are in coupling relation, king pin engaging means on the second fifth wheel comprising jaw means clampingly engageable automatically with the king pin upon coupling engagement so the latter will turn with the jaw means when one fifth wheel rotates relatively to the other, and a resilient body in which the king pin is mounted for absorbing shocks transmitted to the king pin in vehicle operation, and anti-friction bearing means supporting said resilient body to permit rotation thereof incident to rotation of the king pin.

4. Fifth wheel coupling means for tractor-trailer vehicles, comprising a fifth wheel, a king pin associated therewith, resilient means intermediate said fifth wheel and said king pin for floatingly mounting the same relatively thereto, said king pin and said resilient means being mounted for rotation relative to said fifth wheel, a second fifth wheel adapted for face to face contact with the first fifth wheel when said fifth wheels are in coupling relation, king pin engaging means on the second fifth wheel comprising jaw means to impinge and clamp the king pin so that the latter will turn with the jaw means when one fifth wheel rotates relatively to the other.

5. Fifth wheel coupling means for tractor-trailer vehicles, comprising a fifth wheel, a body of rubber or the like material, a king pin mounted in said body, a housing for said body, means for rotatively mounting said housing relative to said fifth wheel, anti-friction means intermediate said housing and said fifth wheel, a second fifth wheel adapted for face to face contact with the first fifth wheel when said fifth wheels are in coupling relation, king pin engaging means on the second fifth wheel comprising jaw means to impinge and clamp the king pin so the latter will turn with the jaw means when one fifth wheel rotates relatively to the other.

GEORGE WALTHER.
ELMER L. MILLER.